(No Model.)
G. WHITNEY.
BICYCLE BRAKE.
No. 580,477. Patented Apr. 13, 1897.
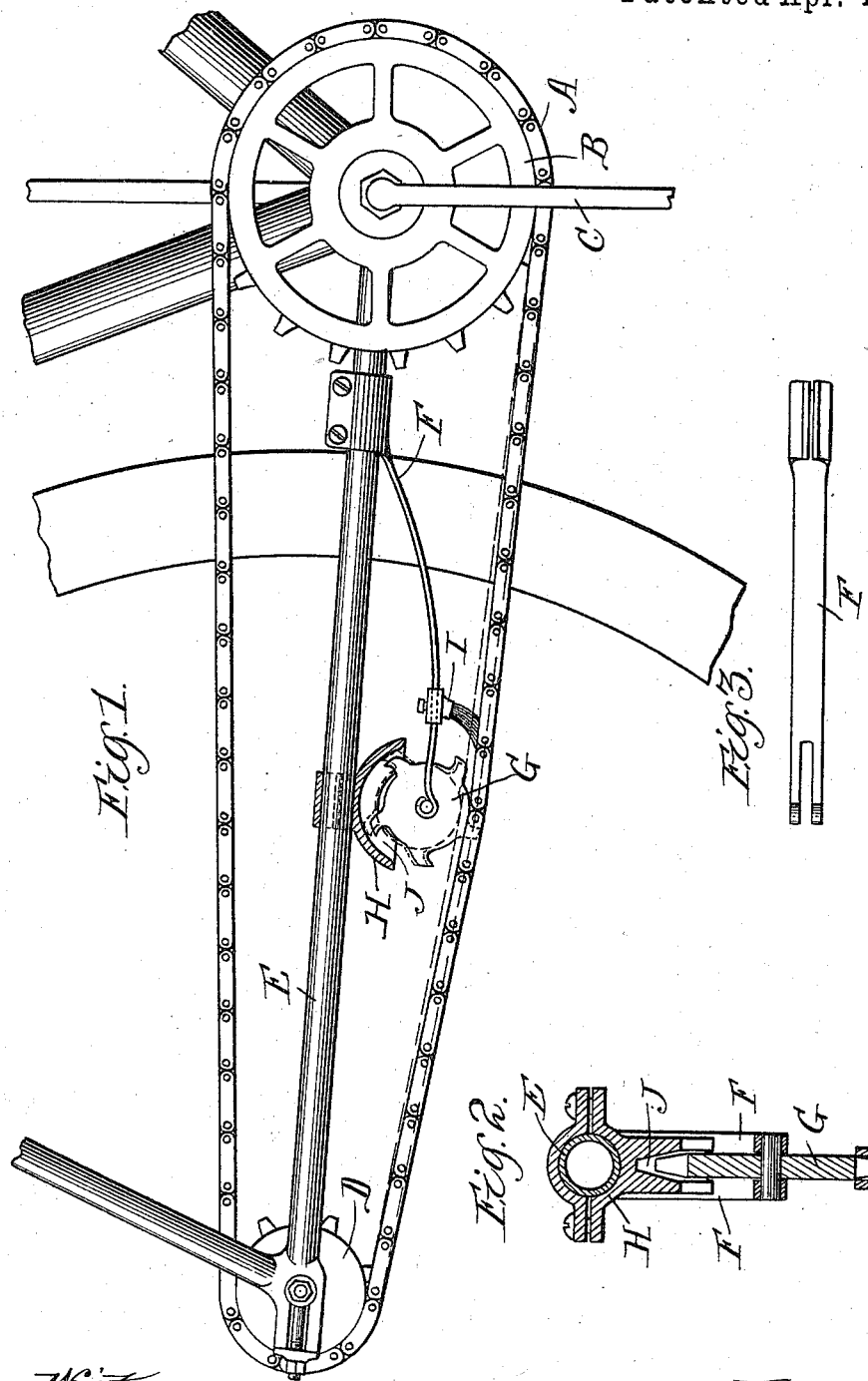
Witnesses.
Inventor
George Whitney,
by C. Whitney.
Atty

UNITED STATES PATENT OFFICE.

GEORGE WHITNEY, OF WINNETKA, ILLINOIS.

BICYCLE-BRAKE.

SPECIFICATION forming part of Letters Patent No. 580,477, dated April 13, 1897.

Application filed December 7, 1896. Serial No. 614,699. (No model.)

*To all whom it may concern:*

Be it known that I, GEORGE WHITNEY, a citizen of the United States, residing at Winnetka, in the county of Cook and State of Illinois, have invented a new and useful Brake and Chain-Tightener Attachment for Bicycles, of which the following is a specification.

My invention relates to bicycles, and is an attachment for the usual bicycle; and it consists in providing a sprocket-wheel and grooved shoe suitably attached to operate as a brake and also as a chain-tightener. I attain these objects by the mechanism illustrated in the accompanying drawings, in which—

Figure 1 is a side view of the usual bicycle driving-chain and sprocket-wheels with that part of the main frame to which the sprocket-wheels are attached and to which my brake is attached. Fig. 2 is a cross-section of a hooked-tooth sprocket-wheel and a grooved shoe. Fig. 3 is a detail showing a spring-support.

Similar letters of reference refer to similar parts throughout the specification.

A represents the driving-chain; B, the driving-sprocket; C, the pedal-crank with pedal broken away; D, the driven sprocket; E, the brace-bar of the bicycle-frame between the two sprocket-wheels.

F represents a spring guide and support attached to brace-bar E by a clasp at its front end, and to its rear end is attached, by means of a journal on each side, a hooked-tooth sprocket-wheel G.

H represents a grooved shoe rigidly attached to bar E; I, a brush attached to spring F in position to sweep the chain for the purpose of cleaning off dust or dirt when the bicycle is being operated.

My brake consists of a grooved shoe being placed rigidly on bar E and projecting downwardly. The groove covers each side of the upper part of a sprocket-wheel G, which is supported by a flexible bar, which presses lightly upon the lower or slack part of the chain, and is thus held out of contact with the grooved shoe.

In operating a bicycle with my brake attached the forward pedaling produces a slack or sag in that part of the chain between the lower edges of the sprocket-wheels, while the upper part of the chain is held straight by the tension produced by the operator in propelling the bicycle. The friction produced by bringing the upper edge of the hooked-tooth sprocket-wheel G in contact with the sides of groove J produces a reverse strain on the driving-chain. When the operator of the bicycle desires to stop, a backward pressure on the pedal reverses the strain of the chain, thus straightening or lifting up the sag in the lower part of the driving-chain, which in turn raises the brake-wheel G to contact with the groove in shoe H, and thus the greater the pressure in backward pedaling the greater will be the friction and consequent retarding strain on the driving-chain. In this way I produce an automatic brake, as the pressure downward of the flexible bar F holds the brake-wheel G out of contact with shoe H, and a backward pressure upon the pedal for the purpose of retarding the speed of the bicycle brings it in contact and produces a retarding friction, this retarding friction being always in proportion to the amount of backward pressure exerted on the pedal. In the drawings I show the brake-wheel and shoe located midway of the two sprocket-wheels, but the location may be varied to suit circumstances.

Deeming the foregoing a sufficient description of my invention, what I claim, and desire to secure by Letters Patent, is—

1. An automatic brake attachment for bicycles comprising in combination a sprocket-wheel swingingly attached to the main frame of a bicycle, a grooved shoe rigidly attached, and an upward and downward flexible and sidewise rigid support for said sprocket-wheel, said sprocket-wheel having hooked teeth adapted to engage the links of a bicycle driving-chain and operate as a chain-tightener, and also adapted to engage within a grooved shoe by means of a backward pressure upon the pedal, substantially as described.

2. In a bicycle an automatically-operated brake and chain-tightener consisting of a yieldingly-mounted sprocket-wheel having a yielding pressure on the slack part of the driving-chain and adapted to be brought in contact with a rigid grooved shoe by backward pressure on the bicycle-pedal, substantially as described.

3. A brake attachment for bicycles embodying the following elements: a grooved shoe fastened rigidly to the lower horizontal brace-bar of a bicycle-frame, a hooked-tooth sprocket-wheel adapted to engage the slack part of a bicycle driving-chain and supported by a sidewise rigid and upward and downward flexible bar attached rigidly to said horizontal brace-bar, said hooked-tooth sprocket-wheel adapted to be brought in contact with the walls of said groove by a backward pressure on the pedals, substantially as described.

GEORGE WHITNEY.

Witnesses:
M. K. MEYER,
J. C. BURKITT.